(12) United States Patent
Oudart

(10) Patent No.: US 8,569,197 B2
(45) Date of Patent: Oct. 29, 2013

(54) PROCESS FOR PREPARING A REFORMING CATALYST COMPRISING A SUPPORT, A GROUP VIIIB METAL AND A GROUP VIIB METAL

(75) Inventor: Yohan Oudart, Lyons (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 753 days.

(21) Appl. No.: 12/276,625

(22) Filed: Nov. 24, 2008

(65) Prior Publication Data

US 2009/0143224 A1    Jun. 4, 2009

(30) Foreign Application Priority Data

Nov. 29, 2007  (FR) .................................... 07 08360

(51) Int. Cl.
*B01J 23/00* (2006.01)
*B01J 23/40* (2006.01)
*B01J 23/42* (2006.01)
*B01J 23/44* (2006.01)
*B01J 27/24* (2006.01)
*B01J 27/185* (2006.01)
*B01J 27/02* (2006.01)
*B01J 27/045* (2006.01)
*C10G 35/00* (2006.01)
*C10G 35/04* (2006.01)
*C10G 35/06* (2006.01)

(52) U.S. Cl.
USPC ........... 502/217; 502/200; 502/213; 502/216; 502/223; 502/325; 502/327; 502/339; 502/353; 208/133; 208/134; 208/135; 208/137; 208/138; 208/139

(58) Field of Classification Search
USPC ......... 502/217, 216, 325, 327, 339, 353, 200, 502/213, 223; 208/133–135, 137–139
See application file for complete search history.

(56) References Cited

U.S. PATENT DOCUMENTS

| | | | |
|---|---|---|---|
| 3,544,376 A * | 12/1970 | Alessandro et al. | 429/17 |
| 3,617,519 A | 11/1971 | Hayes | |
| 3,969,270 A * | 7/1976 | Lester | 502/328 |
| 3,972,829 A | 8/1976 | Michalko | |
| 4,191,638 A * | 3/1980 | Plank et al. | 208/139 |
| 4,333,854 A | 6/1982 | Antos | |
| 4,369,129 A | 1/1983 | Mauldin et al. | |
| 5,139,990 A * | 8/1992 | de Jong et al. | 502/216 |
| 7,514,476 B2 * | 4/2009 | Parasher et al. | 516/78 |
| 7,541,309 B2 * | 6/2009 | Trevino et al. | 502/325 |
| 7,811,964 B2 * | 10/2010 | Galperin et al. | 502/326 |
| 8,283,280 B2 * | 10/2012 | Oudart | 502/227 |
| 2002/0083643 A1 * | 7/2002 | Amendola et al. | 48/61 |
| 2004/0171885 A1 * | 9/2004 | Ishii et al. | 568/38 |

FOREIGN PATENT DOCUMENTS

| | | |
|---|---|---|
| FR | 2006803 A | 1/1970 |
| FR | 0708360 R | 7/2008 |
| GB | 2096481 A | 10/1982 |
| SU | 907909 | * 12/1996 |

OTHER PUBLICATIONS

"Studies on Sulfate Pollution of Pt-Re Reforming Catalysts," D.-Q. Zhang et al. Preprints—American Chemical Society, Division of Petroleum Chemistry (2000), 45(2), pp. 342-344.*

* cited by examiner

*Primary Examiner* — Patricia L Hailey
(74) *Attorney, Agent, or Firm* — Millen, White, Zelano & Branigan, P.C.

(57) ABSTRACT

For preparing a reforming catalyst comprising a support, a group VIIIB metal and a group VIIB metal, comprises the following steps in the order a) then b) or b) then a):

- a step a) impregnating the support with an aqueous solution of hydrochloric acid comprising a group VIIIB metal;
- a step b) impregnating the support with an aqueous solution comprising a group VIIB metal and a sulphur-containing complexing agent in a reducing environment, or a step b) impregnation with an aqueous solution comprising a group VIIB metal, then with a solution comprising a sulphur-containing complexing agent in a reducing environment.

The reducing environment is any reducing atmosphere comprising more than 0.1% by weight of a reducing gas or a mixture of reducing gases; or reducing solutions comprising, with respect to the group VIIB metal, in the range 0.1 to 20 equivalents of reducing metals, reducing organic compounds or inorganic reducing compounds.

31 Claims, No Drawings

PROCESS FOR PREPARING A REFORMING CATALYST COMPRISING A SUPPORT, A GROUP VIIIB METAL AND A GROUP VIIB METAL

FIELD OF THE INVENTION

In this text, the groups for the chemical elements are given by the CAS classification described in the CRC Handbook of Chemistry and Physics, published by CRC Press, Editor-in-chief D R Lide, 81$^{st}$ edition, 2000-2001.

The invention relates to a method for preparing reforming catalysts. There are two major categories of reforming catalyst. Firstly, catalysts for fixed beds generally comprise platinum and rhenium. Secondly, catalysts for moving beds generally comprise platinum and tin.

Catalysts for fixed beds which generally comprise platinum and rhenium are very stable over time and are regenerated every 3 to 24 months. However, their hydrogenolysation activity is too high at the start of each catalytic cycle. This unwanted activity can be reduced by adding sulphur at the end of the reforming catalyst preparation or at the start of the catalytic cycle. The sulphur is generally introduced in a reducing atmosphere by means of $H_2S$. However, the toxicity of $H_2S$ renders it difficult to use. The use of sulphur-containing compounds of the polysulphide type has also been described. This sulphurization step is, however, independent of the other catalyst preparation steps.

The present invention pertains to a process for sulphurization using reducing agents for the formation of coordination complexes of a group VIIB metal, in particular rhenium. The $C_5+$ yields and reformate yields in particular are improved. Further, preparation of the catalyst is simplified since the sulphurization step is no longer independent but integrated into an impregnation step. Finally, using complexing agents can reduce the quantity of hydrochloric acid employed in the preparation.

PRIOR ART

Adding sulphur at the same time as rhenium in order to prepare a platinum-rhenium catalyst has been described in U.S. Pat. No. 4,246,095 which describes the use of an organometallic complex. That patent describes the use of a rhenium-carbonyl component containing sulphur.

U.S. Pat. No. 3,972,829 describes the preparation of a catalyst comprising at least platinum and optionally comprising rhenium via complexing agents. The complexing agents used are organic sulphur-containing acids, such as thio-acids and thiocarboxylic acids.

The preparation process of the invention is distinguished by the use of reducing agents to form coordination complexes of the group VIIB metal, in particular rhenium.

BRIEF DESCRIPTION OF THE INVENTION

The invention concerns a process for preparing a reforming catalyst comprising a support, a group VIIIB metal and a group VIIB metal, and the resultant catalyst said process comprising the following steps in the order a) then b) or b) then a):
  a step a) for impregnating the support with an aqueous solution of hydrochloric acid comprising a group VIIIB metal;
  a step b) for impregnating the support with an aqueous solution comprising a group VIIB metal and a sulphur-containing complexing agent in a reducing environment, or a step b) for impregnation with an aqueous solution comprising a group VIIB metal, then with a solution comprising a sulphur-containing complexing agent in a reducing environment.

The reducing environment is selected from the group constituted by reducing atmospheres comprising more than 0.1% by weight of a reducing gas or a mixture of reducing gases, using reducing solutions comprising, with respect to the group VIIB metal, in the range 0.1 to 20 equivalents of reducing metals, reducing organic compounds or inorganic reducing compounds.

DETAILED DESCRIPTION OF THE INVENTION

For preparing the reforming catalyst comprising a support, a group VIIIB metal and a group VIIB metal, the process comprises the following steps in the order a) then b) or b) then a):
  a step a) for impregnating the support with an aqueous solution of hydrochloric acid comprising a group VIIIB metal, preferably platinum;
  a step b) for impregnating the support with an aqueous solution comprising a group VIIB metal, preferably rhenium, and a sulphur-containing complexing agent in a reducing environment, or a step b) for impregnation with an aqueous solution comprising a group VIIB metal, preferably rhenium, then with a solution comprising a sulphur-containing complexing agent in a reducing environment;
and in which the reducing environment is selected from the group constituted by reducing atmospheres comprising more than 0.1% by weight of a reducing gas or a mixture of reducing gases, using reducing solutions comprising, with respect to the group VIIB metal, in the range 0.1 to 20 equivalents of reducing metals, reducing organic compounds or inorganic reducing compounds.

Adding the sulphur-containing complexing agent in a reducing environment during step b) allows coordination complexes with the group VIIB metal to be formed.

The catalyst support is generally selected from the group constituted by oxides of magnesium, oxides of titanium, oxides of zirconium, alumina and silica, said supports being used alone or as a mixture. The preferred support is alumina.

The specific surface area of the support is generally in the range 50 to 600 $m^2/g$, preferably in the range 150 to 400 $m^2/g$.

The catalyst is generally present in the catalytic bed in the form of beads, extrudates or trilobes, preferably in the form of extrudates.

In a variation, the reducing environment may be a reducing atmosphere comprising more than 0.1% by weight of hydrogen, nitrogen monoxide and/or phosphine ($PH_3$), preferably more than 0.1% by weight of hydrogen.

In another variation, the reducing environment is a reducing solution comprising reduced metals, said reduced metals being selected from the group constituted by metals from columns IIIA, IVA and VA, preferably by aluminium, tin and antimony. Preferably, the reducing metals are present at their lowest oxidation number. Preferably, the oxidation number of tin is +II, as it is in $SnCl_2$.

In another variation, the reducing environment is a reducing solution comprising at least one organic reducing compound selected from the group constituted by reducing carboxylic acids, amines, aldehydes, ketones, alcohols and aromatic alcohols. Preferably, the group is constituted by:
  acetic, formic, oxalic, ascorbic, acrylic, adipic, aspartic, glutaric, carbamic, chloroacetic, citric, diethylmalonic, dihydroxymaleic, fumaric, gluconic, glutamic, glycolic, glyoxylic, iminodiacetic, pimelic, lactic, maleic, malic, malonic, nitrilotriacetic, o-aminobenzoic, anthranilic, phthalic, suberic, succinic, gallic, and tartaric acid and salts thereof;

ammonia, preferably in a basic medium;

primary, secondary and tertiary amines such as methyldiethanolamine, triethanolamine, ethyl p-dimethylaminobenzoate;

formaldehyde, acetaldehyde;

acetone, ethanol, preferably in basic media;

aromatic alcohols such as phenol, gallol derivatives, preferably pyrogallol, ethyl protocatechuate, cetyl protocatechuate, catechol and its derivatives, and hydroquinone and its derivatives.

In another variation, the reducing environment is a reducing solution comprising at least one inorganic reducing compound selected from the group constituted by derivatives of phosphorus, preferably elemental phosphorus, phosphonic, phosphorous, hypophosphonic/hypophosphorous acids and derivative salts thereof.

The reducing environment may also be a reducing solution comprising at least one inorganic reducing compound selected from the group constituted by nitrogen-containing derivatives, preferably hydrazine and its derivatives, hydroxylamine, dinitrogen oxides and nitrites.

It may also be a reducing solution comprising at least one inorganic reducing compound selected from the group constituted by sulphur-containing derivatives, preferably sulphites and their derivatives (bi and polysulphites), sulphurous acids and its salts, and elemental sulphur.

The organic compounds containing, inter alia, the functions containing phosphorus, nitrogen or sulphur described above are also reducing agents which may be envisaged.

The sulphur-containing complexing agent is generally a compound for which the sulphur is bonded to only a single carbon atom.

The sulphur-containing complexing agent generally comprises at least one function selected from the group constituted by thiol functions, thiol functions in association with a carboxylic acid function, thioketones, thioaldehydes and thiocarboxylic acids. It may be any function wherein the sulphur is bonded to only a single carbon atom. Examples of these are the functions: C=S, C—S—H, C—S—S, etc. In such functions, the sulphur has good coordinating power. The carbon-sulphur bond is difficult to break. This increases the stability of the sulphur and thus reduces its tendency to bind to metals. This category excludes thioethers. Preferably, the compound for which the sulphur is only bonded to a single carbon atom is selected from the group constituted by:

sodium diethyldithiocarbamate, potassium ethyl xanthate, thiomalic acid, thioglycolic acid, methanethiolic acid, ethanethiolic acid, propanethiolic acid, ethanedithiolic acid, propanedithiolic acid, mercaptoacetic acid, 3-mercaptopropionic acid, 2-mercaptosuccinic acid, carboxymethylmarcaptosuccinic acid, 2-mercaptonicotinic acid;

sulphur-containing derivatives of EDTA, thio-bis(ethylenenitrilo)tetraacetic acid, ethylene-bis(thioethylenenitrilo) tetraacetic acid, thio-bis(ethylenenitrilo) tetraacetic acid, 2-hydroxy-5-sulpho-1,3-phenylene-bis (methylenenitrilo) tetraacetic acid, and (ethanediylidenetetrathio) tetraacetic acid;

ethanethiol, butanethiols, propanethiols, pentanethiols, hexanethiols, cyclohexanethiols, ethanedithiols, toluenedithiols, di-mercaptopropanol, cysteine, 2,3-dimercapto-1-propanol, 2,3-dimercaptopropane-1-sulphonic acid, penicillamine, imidazole-2-thiol, 2-thiazoline-2-thiol, and pyridine-2-thiol;

thiourea.

The sulphur-containing complexing agent may also be selected from the group constituted by sulphates and sulphuric acid.

In a variation of the invention, the sulphur-containing complexing agent may also contain other coordinating functions (such as carboxylic acid, amine etc functions).

Additional complexing agents may be added to complete the coordination sphere of the metal. Adding them is not vital, however. Solubility of all of the complexing agents (sulphur-containing or otherwise) in an aqueous medium is desirable.

Said ligands may be varied in nature. They contain no sulphur atoms. Carboxylic acids are particularly appreciated such as, for example, acetic, acrylic, adipic, aspartic, carbamic, chloroacetic, citric, diethylmalonic, dihydroxymaleic, formic, fumaric, gluconic, glutamic, glutaric, glycolic, glyoxylic, iminodiacetic, lactic, maleic, malic, malonic, nitriloacetic, o-aminobenzoic, oxalic, phthalic, pimelic, suberic, succinic, tartaric, citric acid, etc, but also non-sulphur-containing amino acids, di-, tri-, tetra-, penta- and hexa-acetic acids such as nitriloacetic acid, pentetic acid, EDTA and derivatives thereof.

The other complexing agents which may be used are 1,3-diketones such as acetylacetone, its salts and its derivatives, in particular fluorine-containing derivatives such as trifluoroacetylacetone, polyamines such as ethylene diamine and its tri- and tetra-amino derivatives, or aminoalcohols such as triethanolamine.

Following steps a) then b) or b) then a), the process for preparing a catalyst may include a step c) for drying then calcining in an inert or oxidizing atmosphere, the drying temperature being in the range 80° C. to 200° C., preferably in the range 100° C. to 150° C. for 5 minutes to 5 days, the calcining temperature being in the range 300° C. to 850° C. for between 5 minutes and 20 hours, preferably between 20 minutes and 16 hours.

Following step c), the catalyst preparation process may include a step d) for reducing the catalyst in hydrogen at a temperature in the range 300° C. to 850° C. for 5 minutes to 20 hours, preferably in the range 20 minutes to 16 hours.

In a variation, the catalyst preparation process may also comprise, between step a) and b), before step a) or after step b), a step for impregnation using a solution comprising at least one promoter metal selected from the group formed by scandium, yttrium, tin, germanium, indium, antimony, lead, thallium, gallium, bismuth, phosphorus, arsenic, lanthanides and actinides.

The final quantity of group VIIIB element in the catalyst is generally in the range 0.01% by weight to 5% by weight, preferably in the range 0.01% by weight to 2% by weight.

The final quantity of group VIIB element in the catalyst is generally in the range 0.01% by weight to 7% by weight, preferably in the range 0.01% by weight to 3% by weight.

The final sulphur content in the catalyst is generally in the range 1 ppm by weight to 5% by weight, preferably in the range 10 ppm by weight to 3% by weight, and highly preferably in the range 100 to 5000 ppm by weight.

In order to obtain a final sulphur content in the range 100 to 5000 ppm by weight, the following methods are possible:

A first method consists of using complexing agents containing only a single sulphur atom.

A second method consists of using poly-sulphur complexing agents. In this case, part of the rhenium is introduced without a sulphur-containing complexing agent. This rhenium is introduced either before or during or after impregnation by the rhenium/sulphur-containing complexing agent coordination complex. The advantage of this second method over the method which does not employ a complexing agent is that it uses less acid in the preparation.

The final quantity of chlorine in the catalyst is generally in the range 0.1% by weight to 15% by weight, preferably in the range 0.3% to 10%.

In a variation, the solution comprising platinum is an aqueous solution of hexachloroplatinic acid in the presence of hydrochloric acid.

In a variation, the solution comprising rhenium is perrhenic acid or ammonium perrhenate.

The invention also concerns the catalyst obtained by the above preparation processes.

The invention also concerns a process for using catalysts prepared using the above preparation processes in reforming reactions, the feed comprising paraffinic, naphthenic and aromatic hydrocarbons containing 5 to 12 carbon atoms per molecule, said feed being brought into contact with the catalyst at a temperature in the range 400° C. to 700° C. The mass flow rate of feed treated per unit mass of catalyst is in the range 0.1 to 10 kg/(kg·h). The operating pressure is in the range 0.1 to 4 MPa.

Part of the hydrogen produced is generally recycled at a molar recycle ratio in the range 0.1 to 10. This ratio is the molar ratio of the flow rate of recycled hydrogen to the flow rate of the feed.

EXAMPLE

Example 1

(Not in Accordance): Preparation of Catalyst A

Step a)

The support was an alumina with a specific surface area of 210 m²/gram.

100 g of support was brought into contact with 500 cm³ of an aqueous solution of hydrochloric acid and hexachloroplatinic acid comprising 0.30 g of platinum.

The quantity of hydrochloric acid was adjusted in order to produce a chlorine content of close to 1% in the final catalyst. The impregnation solution was then removed.
Step b)

650 cm³ of an aqueous solution comprising 0.86 g of rhenium introduced in the form of ammonium perrhenate was heated for 4 hours and brought into contact with the platinum-comprising support obtained at the end of the preceding step for 3 hours.
Step c)

The support obtained at the end of the preceding step was dried for 1 hour at 120° C., calcined for 2 hours at 500° C., then reduced in hydrogen $H_2$ at 500° C.
Step d)

Finally, sulphurization was carried out with a hydrogen/$H_2S$ mixture (2000 ppm by weight of $H_2S$) for 7 minutes at 500° C. (flow rate: 220 cm³/min).

Example 2

(Not in Accordance): Preparation of Catalyst B

Step a) was carried out in identical manner to that of Example 1.

Next, in a nitrogen atmosphere, 650 cm³ of an aqueous solution comprising 0.86 g of rhenium introduced in the form of ammonium perrhenate, 0.886 g of citric acid and 0.7 g of thiomalic acid was heated for 4 hours and brought into contact with the platinum-containing support for 3 hours.

In order to finish preparation of the catalyst, step c) was carried out in a manner which was identical to that described in Example 1.

Example 3

(In Accordance): Preparation of Catalyst C

Step a) was carried out in identical manner to that of Example 1.

Next, in a nitrogen atmosphere, 650 cm³ of an aqueous solution comprising 0.86 g of rhenium introduced in the form of ammonium perrhenate, 0.886 g of citric acid, 0.7 g of thiomalic acid and 2.7 g of oxalic acid (20 equivalents) was heated for 4 hours and brought into contact with the platinum-containing support for 3 hours.

In order to finish preparation of the catalyst, step c) was carried out in a manner which was identical to that described in Example 1.

Example 4

(In Accordance): Preparation of Catalyst D

Step a) was carried out in identical manner to that of Example 1.

Next, in a nitrogen atmosphere, 650 cm³ of an aqueous solution comprising 0.86 g of rhenium introduced in the form of ammonium perrhenate, 0.886 g of citric acid, 0.7 g of thiomalic acid and 288 mg of hydrazine was heated for 4 hours and brought into contact with the platinum-containing support for 3 hours.

In order to finish preparation of the catalyst, step c) was carried out in a manner which was identical to that described in Example 1.

Example 5

(In Accordance): Preparation of Catalyst E

Step a) was carried out in identical manner to that of Example 1.

Next, in a nitrogen atmosphere, 650 cm³ of an aqueous solution comprising 0.86 g of rhenium introduced in the form of ammonium perrhenate, 0.886 g of citric acid, 0.7 g of thiomalic acid and 1.03 g of tin (II) chloride ($SnCl_2$) was heated for 4 hours and brought into contact with the platinum-containing support for 3 hours.

In order to finish preparation of the catalyst, step c) was carried out in a manner which was identical to that described in Example 1.

Example 6

(In Accordance): Preparation of Catalyst F

Step a) was carried out in identical manner to that of Example 1.

Next, in a nitrogen atmosphere, 650 cm³ of an aqueous solution comprising 0.86 g of rhenium introduced in the form of ammonium perrhenate, 0.886 g of citric acid, 0.7 g of thiomalic acid and 1.88 g of phosphorous acid was heated for 4 hours and brought into contact with the platinum-containing support for 3 hours.

In order to finish preparation of the catalyst, step c) was carried out in a manner which was identical to that described in Example 1.

Example 7

(In Accordance): Preparation of Catalyst G

Step a) was carried out in identical manner to that of Example 1.

Next, in a nitrogen atmosphere, 650 cm$^3$ of an aqueous solution comprising 0.86 g of rhenium introduced in the form of ammonium perrhenate, 0.886 g of citric acid, 0.7 g of thiomalic acid and 206 mg of oxalic acid (0.5 equivalents) was heated for 4 hours and brought into contact with the platinum-containing support for 3 hours.

In order to finish preparation of the catalyst, step c) was carried out in a manner which was identical to that described in Example 1.

Example 8

(In Accordance): Preparation of Catalyst H

Step a) was carried out in identical manner to that of Example 1.

Next, in a nitrogen atmosphere, 650 cm$^3$ of an aqueous solution comprising 0.86 g of rhenium introduced in the form of ammonium perrhenate, 0.886 g of citric acid, 0.7 g of thiomalic acid and 1.4 g of formic acid (20 equivalents) was heated for 4 hours and brought into contact with the platinum-containing support for 3 hours.

In order to finish preparation of the catalyst, step c) was carried out in a manner which was identical to that described in Example 1.

Example 9

(In Accordance): Preparation of Catalyst I

Step a) was carried out in identical manner to that of Example 1.

Next, in a nitrogen atmosphere, 650 cm$^3$ of an aqueous solution comprising 0.86 g of rhenium introduced in the form of ammonium perrhenate, 0.886 g of citric acid, 0.7 g of thiomalic acid and 1.6 g of sodium nitrite was heated for 4 hours and brought into contact with the platinum-containing support for 3 hours.

In order to finish preparation of the catalyst, step c) was carried out in a manner which was identical to that described in Example 1.

Example 10

Catalytic Tests

Catalysts A to I were tested by transforming a feed with the following characteristics:

| | |
|---|---|
| Density at 20° C. | 0.753 kg/dm$^3$ |
| Research octane number | −60 |
| Paraffins content | 49.4% by volume |
| Naphthenes content | 35.1% by volume |
| Aromatics content | 15.5% by volume |

This transformation was carried out in the presence of hydrogen at a temperature of 490° C., and a total pressure of 0.3 MPa.

Before injecting the feed, the catalysts were activated at high temperature in hydrogen for 2 hours.

The performances obtained after 24 h of function are reported in Table 1.

TABLE 1

| Sample | Reformate yield (wt %) | Research octane number | C5+ yield (wt %) |
|---|---|---|---|
| A | 90.7 | 99.6 | 72.6 |
| B | 89.5 | 99.6 | 71 |
| C | 91.2 | 99.6 | 73.2 |
| D | 91.5 | 99.6 | 74.3 |
| E | 90.1 | 99.6 | 73.1 |
| F | 91.2 | 99.6 | 73.2 |
| G | 89.9 | 99.6 | 72.8 |
| H | 91.2 | 99.6 | 73.2 |
| I | 90.5 | 99.6 | 72.9 |

A surprising improvement in performance (C5+ and/or reformate yields) for catalysts C to I (in accordance with the invention) can be seen compared with the performances of catalysts A and B (not in accordance with the invention). Further, introducing sulphur in a complexing medium and reducing agent during step b) avoids the final catalyst sulphurization step.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application Ser. No. 07/08.360, filed Nov. 29, 2007 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for preparing a reforming catalyst comprising a support, a group VIIIB metal and a group VIIB metal, said process comprising the following steps in the order of 1) then 2) or 2) then 1):
   (1) a step for impregnating the support with an aqueous solution of hydrochloric acid comprising a group VIIIB metal;
   (2) a step for impregnating the support with
      a) an aqueous solution comprising a group VIIB metal and a sulphur-containing complexing agent in a reducing environment in order to form a coordination compound with said group VIIB metal, or
      b) with an aqueous solution comprising a group VIIB metal, then impregnating the resultant support containing the group VIIB metal with a solution comprising a sulphur-containing complexing agent in a reducing environment in order to form a coordination compound with said group VIIB metal;
wherein the reducing environment in both (2)(a) and (2)(b) is constituted by:
a reducing atmosphere comprising more than 0.1% by weight of a reducing gas or a mixture of reducing gases, or
a reducing solution comprising, with respect to the group VIIB metal, in the range of 0.1 to 20 equivalents of one or more reducing metals, reducing organic compounds or inorganic reducing compounds,
wherein the reducing environment is a reducing solution comprising at least one inorganic reducing phosphorus compound or at least one inorganic reducing nitrogen-containing compound, and/or
wherein the sulphur-containing complexing agent in step (b) is a compound in which the sulphur is bonded to only one carbon atom.

2. A process for preparing a reforming catalyst according to claim 1, in which the group VIIIB metal is platinum and the group VIIB metal is rhenium, and the process comprising step (2a) and not step (2b).

3. A preparation process according to claim 2, in which the reducing environment is a reducing solution comprising reduced metals selected from elements from groups MA, WA and VA of the periodic table of the elements.

4. A preparation process according to claim 2, in which the reducing environment is a reducing solution comprising at least one reducing organic compound selected from reducing carboxylic acids, amines, aldehydes, ketones, alcohols and aromatic alcohols.

5. A preparation process according to claim 4, in which the reducing environment is a reducing solution comprising at least one organic reducing compound selected from:
acetic, formic, oxalic, ascorbic, acrylic, adipic, aspartic, glutaric, carbamic, chloroacetic, citric, diethylmalonic, dihydroxymaleic, fumaric, gluconic, glutamic, glycolic, glyoxylic, iminodiacetic, pimelic, lactic, maleic, malic, malonic, nitrilotriacetic, o-aminobenzoic, anthranilic, phthalic, suberic, succinic, gallic and tartaric acids and salts thereof;
ammonia;
primary, secondary and tertiary amines;
formaldehyde, acetaldehyde;
acetone, ethanol;
aromatic alcohols such as phenol, gallol derivatives, ethyl protocatechuate, cetyl protocatechuate, catechol and functional derivatives thereof, and hydroquinone functional derivatives thereof.

6. A preparation process according to claim 2, in which the reducing environment is a reducing solution comprising at least one inorganic reducing phosphorus compound.

7. A preparation process according to claim 2, in which the reducing environment is a reducing solution comprising at least one inorganic reducing nitrogen-containing compound.

8. A process for preparing a catalyst according to claim 2, further comprising, after steps (1) and (2), a step c) for drying then calcining the catalyst in an inert or oxidizing atmosphere, the drying temperature being in the range of 80° C. to 200° C., the drying period between 5 minutes and 5 days, the calcining temperature being in the range of 300° C. to 850° C. and the calcining period between 5 minutes and 20 hours.

9. A process for preparing a catalyst according to claim 8 comprising, after step c), a step d) for reducing the catalyst in hydrogen at a temperature in the range of 300° C. to 850° C. for 5 minutes to 20 hours.

10. A process for preparing a catalyst according to claim 2, further comprising a step of impregnating, between step (1) and (2), before step (1) or after step (2), a solution comprising at least one promoter metal from the group consisting of scandium, yttrium, tin, germanium, indium, antimony, lead, thallium, gallium, bismuth, phosphorus, arsenic, lanthanides and actinides.

11. A process for preparing a catalyst according to claim 2, in which the support is an alumina.

12. A process for preparing a catalyst according to claim 2, in which the final quantity platinum metal in the catalyst is in the range of 0.01% by weight to 5% by weight, in which the final quantity of rhenium in the catalyst is in the range of 0.01% by weight to 7% by weight, and in which the final sulphur content in the catalyst is in the range of 1 ppm by weight to 5% by weight.

13. A process for preparing a catalyst according to claim 2, comprising a final quantity of chlorine in the catalyst in the range of 0.1% by weight to 15% by weight.

14. A process for preparing a catalyst according to claim 2, in which the solution comprising platinum is an aqueous solution of hexachloroplatinic acid in the presence of hydrochloric acid.

15. A process for preparing a catalyst according to claim 14, in which the solution comprising rhenium is perrhenic acid or ammonium perrhenate.

16. A process according to claim 2, wherein the reducing environment comprises hydrazine.

17. A process according to claim 16, wherein the sulphur containing organic complexing agent is thiomalonic acid.

18. A process according to claim 17 wherein the impregnating solution containing the sulfur containing complexing agent further comprises citric acid.

19. A catalyst produced by the process of claim 18.

20. In a catalytic reforming process comprising contacting a petroleum feed with a catalyst at 400-700 C.°, the improvement wherein the catalyst is according to claim 19.

21. A process according to claim 18, further comprising heating the solution containing a rhenium compound, the thiomalonic acid, citric acid and hydrazine under sufficient conditions to form the coordination compound.

22. A catalyst produced by the process of claim 21.

23. In a catalytic reforming process comprising reacting a petroleum feed comprising paraffinic, naphthenic and aromatic hydrocarbons having 5-12 carbon atoms with a catalyst at 400-700 C.°, the improvement wherein the catalyst is according to claim 22.

24. A catalyst produced by the process of claim 2.

25. In a catalytic reforming process comprising reacting a petroleum feed comprising paraffinic, naphthenic and aromatic hydrocarbons having 5-12 carbon atoms with a catalyst at 400-700 C.°, the improvement wherein the catalyst was prepared is according to claim 2.

26. A process for preparing a catalyst according to claim 1, in which the sulphur-containing complexing agent comprises at least one of the following functions: a thiol function, a thiol function in association with a carboxylic acid function, a thioketone, a thioaldehyde and a thiocarboxylic acid.

27. A process for preparing a catalyst according to claim 26, in which the sulphur-containing complexing agent is any of:
sodium diethyldithiocarbamate, thiomalic acid, thioglycolic acid, methanethiolic acid, ethanethiolic acid, propanethiolic acid, ethanedithiolic acid, propanedithiolic acid, mercaptoacetic acid, 3-mercaptopropionic acid, 2-mercaptosuccinic acid, carboxymethylmercaptosuccinic acid, 2-mercaptonicotinic acid;

sulphur-containing derivatives of EDTA, thio-bis(ethylenenitrilo)tetraacetic acid, ethylene-bis(thioethylenenitrilo) tetraacetic acid, thio-bis(ethylenenitrilo) tetraacetic acid, 2-hydroxy-5-sulpho-1,3-phenylene-bis (methylenenitrilo) tetraacetic acid, and (ethanediylidenetetrathio) tetraacetic acid;

ethanethiol, butanethiols, propanethiols, pentanethiols, hexanethiols, cyclohexanethiols, ethanedithiols, toluenedithiols, di-mercaptopropanol, potassium ethyl xanthate, cysteine, 2,3-dimercapto-1-propanol, 2,3-dimercaptopropane-1-sulphonic acid, penicillamine, imidazole-2-thiol, 2-thiazoline-2-thiol, and pyridine-2-thiol;

thiourea.

28. A process according to claim 2, wherein the reducing agent is phosphorous acid and the sulfur containing organic complexing agent is thiomalonic acid.

29. In a catalytic reforming process comprising reacting a petroleum feed comprising paraffinic, naphthenic and aromatic hydrocarbons having 5-12 carbon atoms with a catalyst at 400-700 C.°, the improvement wherein the catalyst was prepared is according to claim 28.

30. In a catalytic reforming process comprising reacting a petroleum feed comprising paraffinic, naphthenic and aromatic hydrocarbons having 5-12 carbon atoms with a catalyst at 400-700 C.°, the improvement wherein the catalyst was prepared is according to claim 1.

31. A process for preparing a reforming catalyst according to claim 1, wherein the reducing environment is a reducing solution comprising at least one inorganic reducing phosphorus compound or at least one inorganic reducing nitrogen-containing compound, and wherein the sulphur-containing complexing agent in step (b) is a compound in which the sulphur is bonded to only one carbon atom.

* * * * *

UNITED STATES PATENT AND TRADEMARK OFFICE
CERTIFICATE OF CORRECTION

| | |
|---|---|
| PATENT NO. | : 8,569,197 B2 |
| APPLICATION NO. | : 12/276625 |
| DATED | : October 29, 2013 |
| INVENTOR(S) | : Oudart |

Page 1 of 1

It is certified that error appears in the above-identified patent and that said Letters Patent is hereby corrected as shown below:

In the Claims

Column 9, line 26 reads "reduced metals selected from elements from groups MA, WA" should read -- reduced metals selected from elements from groups IIIA, IVA --

Signed and Sealed this
Twenty-fifth Day of February, 2014

Michelle K. Lee
*Deputy Director of the United States Patent and Trademark Office*